US008825898B2

(12) United States Patent
Previdi et al.

(10) Patent No.: US 8,825,898 B2
(45) Date of Patent: Sep. 2, 2014

(54) TECHNIQUE FOR OPTIMIZED ROUTING OF DATA STREAMS ON AN IP BACKBONE IN A COMPUTER NETWORK

(75) Inventors: Stefano B. Previdi, Rome (IT); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1580 days.

(21) Appl. No.: 11/449,162

(22) Filed: Jun. 8, 2006

(65) Prior Publication Data

US 2007/0208874 A1    Sep. 6, 2007

(30) Foreign Application Priority Data

Mar. 1, 2006  (IT) .............................. TO2006A0149

(51) Int. Cl.
*G06F 15/173* (2006.01)
*H04L 29/08* (2006.01)
*G06F 15/16* (2006.01)

(52) U.S. Cl.
CPC ........ *H04L 67/1008* (2013.01); *H04L 67/1002* (2013.01); *H04L 67/2814* (2013.01); *H04L 67/101* (2013.01)
USPC .......................................... 709/238; 709/217

(58) Field of Classification Search
USPC ......................................................... 709/238
See application file for complete search history.

(56) References Cited

U.S. PATENT DOCUMENTS

| 6,178,160 | B1 | 1/2001 | Bolton et al. | |
|---|---|---|---|---|
| 6,327,622 | B1 * | 12/2001 | Jindal et al. | 709/228 |
| 6,400,722 | B1 | 6/2002 | Chuah et al. | |
| 6,415,323 | B1 * | 7/2002 | McCanne et al. | 709/225 |
| 6,792,461 | B1 * | 9/2004 | Hericourt | 709/225 |
| 6,795,858 | B1 | 9/2004 | Jain et al. | |
| 6,820,134 | B1 | 11/2004 | Zinin | |
| 6,832,239 | B1 * | 12/2004 | Kraft et al. | 709/203 |
| 6,850,982 | B1 | 2/2005 | Siegel | |
| 6,862,624 | B2 | 3/2005 | Colby et al. | |
| 6,937,576 | B1 | 8/2005 | DiBenedetto | |
| 6,970,913 | B1 | 11/2005 | Albert et al. | |
| 6,996,615 | B1 | 2/2006 | McGuire | |
| 7,002,917 | B1 | 2/2006 | Saleh | |
| 7,031,262 | B2 | 4/2006 | Vasseur | |
| 7,047,315 | B1 | 5/2006 | Srivastava | |

(Continued)

OTHER PUBLICATIONS

G. Banga, Measuring the capacity of a web server under realistic loads, 1999, Baltzer Science Publishers, World Wide Web 2 (1999).*
PCT Notification of Transmittal of the International Search Report and the Written Opinion of the International Searching Authority, or the Declaration, International Application No. PCT/US07/04746, International Filing Date Feb. 22, 2007, Date of Mailing: Oct. 25, 2007, 8 pages.

(Continued)

*Primary Examiner* — Krista Zele
*Assistant Examiner* — Tariq Najee-Ullah
(74) *Attorney, Agent, or Firm* — Novak Druce Connolly Bove + Quigg LLP (57) ABSTRACT

A technique optimizes routing of application data streams on an Internet Protocol (IP) backbone in a computer network. According to the novel technique, a client router learns of server states (e.g., number of pending requests, etc.) of a plurality of application servers and also determines metrics of intermediate links between the application servers and the client router (intermediate link metrics), e.g., particularly link metrics in a direction from the application servers to the client router. Upon receiving an application request from an application client ("client request"), the client router determines to which of the application servers the client request is to be sent based on the server states and intermediate link metrics, and sends the client request accordingly.

34 Claims, 8 Drawing Sheets

(56) References Cited

U.S. PATENT DOCUMENTS

| | | | |
|---|---|---|---|
| 7,180,864 B2* | 2/2007 | Basu et al. | 370/238 |
| 7,305,677 B2* | 12/2007 | Marcey et al. | 719/310 |
| 7,406,523 B1* | 7/2008 | Kruy et al. | 709/227 |
| 7,636,781 B2* | 12/2009 | Li et al. | 709/226 |
| 7,835,286 B2* | 11/2010 | Verchere et al. | 370/238 |
| 8,072,900 B2* | 12/2011 | Antal et al. | 370/252 |
| 8,234,388 B2* | 7/2012 | Tai et al. | 709/229 |
| 2002/0051449 A1* | 5/2002 | Iwata | 370/389 |
| 2002/0078223 A1 | 6/2002 | Baldonado et al. | |
| 2002/0091853 A1* | 7/2002 | Moore et al. | 709/236 |
| 2003/0016672 A1* | 1/2003 | Rosen et al. | 370/392 |
| 2003/0174653 A1* | 9/2003 | Basu et al. | 370/238 |
| 2003/0210694 A1* | 11/2003 | Jayaraman et al. | 370/392 |
| 2003/0229697 A1* | 12/2003 | Borella | 709/226 |
| 2004/0103204 A1* | 5/2004 | Yegin | 709/229 |
| 2004/0205215 A1 | 10/2004 | Kouvelas et al. | |
| 2004/0210775 A1* | 10/2004 | Gbadegesin | 713/201 |
| 2005/0102405 A1 | 5/2005 | Siegel | |
| 2005/0193114 A1 | 9/2005 | Colby | |
| 2005/0265258 A1* | 12/2005 | Kodialam et al. | 370/254 |
| 2006/0039391 A1 | 2/2006 | Vasseur | |
| 2006/0098589 A1 | 5/2006 | Kreeger | |
| 2006/0106938 A1* | 5/2006 | Dini et al. | 709/228 |
| 2007/0143460 A1* | 6/2007 | Ben-David et al. | 709/223 |
| 2007/0211703 A1* | 9/2007 | Gu et al. | 370/356 |
| 2010/0061301 A1* | 3/2010 | Antal et al. | 370/328 |

OTHER PUBLICATIONS

Italian Patent Application No. TO2006A000149, filed on Mar. 1, 2006, by Stefano B. Previdi, et al., entitled Tecnica Per L'Instradamento Ottimizzato Di Flussi Di Dati Su Una Dorsale Ip in Una Rete Di Computer.

Perlman, R., Interconnections Second Edition: Bridges, Routers, Switches, and Internetworking Protocols, Section 1.1, Addison Wesley Longman, Inc., pp. 1-7.

Perlman, R., Interconnections Second Edition: Bridges, Routers, Switches, and Internetworking Protocols, Section 12.2.4, Addison Wesley Longman, Inc., pp. 317-319.

Smit, H., et al., Network Working Group Request for Comments 3784, entitled Intermediate System to Intermediate System (IS-IS) Extensions for Traffic Engineering (TE), Jun. 2004, pp. 1-13.

Callon, R., Network Working Group Request for Comments 1195, entitled Use of OSI IS-IS for Routing in TCP/IP and Dual Environments, Dec. 1990, pp. 1-80.

Moy, J., Network Working Group Request for Comments 2328, entitled OSPF Version 2, Apr. 1998, pp. 1-204.

Katz, D., et al., Network Working Group Request for Comments 3630, entitled Traffic Engineering (TE) Extensions to OSPF Version 2, Sep. 2003, pp. 1-14.

\* cited by examiner

| APPLICATION SERVER ID 605 | ACTIVE CONNECTIONS 610 | PENDING REQUESTS 615 | CPU LOAD 620 | MEMORY LOAD 625 | UTILIZED BANDWIDTH 630 | OTHER STATES 635 |
|---|---|---|---|---|---|---|
| SERVER 1 | DATA 1 | | | | | |
| SERVER 2 | DATA 2 | | | | | |
| ... | | | | | | |
| SERVER N | DATA N | | | | | |

APPLICATION SERVER TABLE 600

ENTRIES 650

TECHNIQUE FOR OPTIMIZED ROUTING OF DATA STREAMS ON AN IP BACKBONE IN A COMPUTER NETWORK

CROSS REFERENCE TO RELATED APPLICATIONS

This Application claims the priority benefit of Italian Patent Application No. TO2006A000149, filed Mar. 1, 2006, by Stefano B. Previdi, et al., entitled TECNICA PER LINSTRADAMENTO OTTIMIZZATO DI FLUSSI DI DATI SU UNA DORSALE IP IN UNA RETE DI COMPUTER, the contents of which are hereby incorporated by reference in their entirety.

BACKGROUND OF THE INVENTION

1. Field of the Invention

The present invention relates to computer networks and more particularly optimizing routing of application data streams on an Internet Protocol (IP) backbone in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an area or level, or more particularly, an AS, is generally referred to as a "domain."

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP advertisements") for exchanging routing information between interconnected intermediate network nodes (IGP nodes). As used herein, an IGP advertisement generally describes any message used by an IGP routing protocol for communicating routing information among interconnected IGP nodes, i.e., routers and switches. Operationally, a first IGP node may generate an IGP advertisement and "flood" (i.e., transmit) the packet over each of its network interfaces coupled to other IGP nodes. Thereafter, a second IGP node may receive the flooded IGP advertisement and update its routing table based on routing information contained in the received IGP advertisement. Next, the second IGP node may flood the received IGP advertisement over each of its network interfaces, except for the interface at which the IGP Advertisement was received. This flooding process may be repeated until each interconnected IGP node has received the IGP advertisement and updated its local routing table.

In practice, each IGP node typically generates and disseminates an IGP advertisement whose routing information includes a list of the intermediate node's neighboring network nodes and one or more "cost" values associated with each neighbor. As used is herein, a cost value associated with a neighboring node is an arbitrary metric (a "link metric") used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc. Notably, as those skilled in the art will understand, Traffic Engineering (TE) extensions to IGP advertisements may be used to convey various link metrics, such as, e.g., link utilization, etc. Examples of TE extensions for IGP can be found in RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of both of which are hereby incorporated by reference in their entirety.

As noted, IGP advertisements are usually flooded until each intermediate network IGP node has received an IGP advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes, i.e., thus computing a "shortest path tree" (SPT), as will be understood by those skilled in the art. For example, the Dijkstra algorithm is a conventional technique for performing such an SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

The data packets transferred among the network nodes may include fixed-sized data cells and/or variable-sized data frames. Each data packet typically comprises "pay-load" data prepended ("encapsulated") by at least one network header formatted in accordance with a network communication protocol. The network headers include information that enables the client nodes and intermediate nodes to route the packet efficiently through the computer network. Often, a packet's network headers include at least a datalink (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

In operation, a client node may send a data packet to a network interface of an intermediate network node. Thereafter, the intermediate network node receives the packet and forwards the packet to its next destination. For example, the intermediate network node may perform a layer-2 switching function that simply re-directs the packet from one network interface to another based on the contents of the packet's data-link header. Alternatively, the intermediate network node may perform a layer-3 routing function, or forwarding decision, that selects the most appropriate network interface to forward the packet based on the contents of the packet's internetwork header.

Data packets are used to transport many forms of information over networks and subnetworks. For instance, video information may be transmitted in accordance with Video on Demand (VoD) standards known to those skilled in the art. VoD refers to a group of technologies used to transmit video information over data networks from a source node (e.g., a VoD application server) to a destination node (e.g., a VoD application client). The source and destination nodes employ voice agents that convert video information from its traditional form to a form that is suitable for packet transmission. In other words, the source node's video agent encodes, compresses, and encapsulates the video information into a plurality of data packets, and the destination node's voice agent performs complementary functions to de-encapsulate, uncompress, and decode the VoD packets. For instance, a VoD content server may supply video data streams to one or more "set-top-boxes" of users. Also, music information may be transmitted in accordance with standards known to those skilled in the art in a similar manner to VoD. Examples of music agents may include personal computers (PCs) running music applications (e.g., Apple® Corporation's iTunes® music program), network devices providing music services (e.g., Internet jukeboxes), etc. Notably, the use of VoD and music services are examples of applications (e.g., at an application layer) that a node within the network may operate. Those skilled in the art will understand that other applications may also be operated at network nodes.

A source node (sender) may be configured to transfer a unidirectional stream of data packets, or a "data flow," to a destination node (receiver) in a data network. The data stream may comprise, for example, data or video/music information. The data stream is unidirectional in that data travels one-way from the sender to the receiver. The logical procession of intermediate network nodes that transmit and receive data packets from the sender to the receiver defines the data stream's data path. A first node that is nearer the receiver in the data stream's data path than a second node in the stream is said to be "downstream" from the second node. Likewise, a first node that is nearer the sender in the data stream's path than a second node in the stream is said to be "upstream" from the second node.

Generally, in today's network configurations, multiple application content servers (e.g., VoD, music, etc.) may be dispersed throughout different parts of the network in order to ensure redundancy of the data and to provide load balancing/sharing of requests from application clients. Notably, though, when using standard IP routing within the network (e.g., an "IP backbone"), there is no communication between the routing layer and the application layer to provide for efficient load balancing. This often creates an inconsistency in algorithms used by the application layer to attempt to load balance client requests to the multiple application servers.

For example, a VoD client may request a video data stream from a VoD server, which has been selected by the VoD application of the client. However, the VoD application of the client is not aware of the network resources that are utilized by the data stream from the selected server (e.g., the links/nodes the video stream would traverse from the server to the client). Because of this, any attempts to load balance client requests by the application layer are inefficient without knowledge of the network resources and their current state, particularly when utilizing an IP backbone. Further, because the routing layer is not aware of the application requests or the state of the application servers; any attempts to load balance client requests by the routing layer are also inefficient. There remains a need, therefore, for an efficient technique that optimizes routing of application data streams on an IP backbone based on both application layer information and routing layer information.

SUMMARY OF THE INVENTION

The present invention is directed to a technique for optimizing routing of application data streams on an Internet Protocol (IP) backbone in a computer network. According to the novel technique, a client router learns of server states (e.g., number of pending requests, etc.) of a plurality of application servers and also determines metrics of intermediate links between the application servers and the client router (intermediate link metrics), e.g., particularly link metrics in a direction from the application servers to the client router. Upon receiving an application request from an application client ("client request"), the client router determines to which of the application servers the client request is to be sent based on the server states and intermediate link metrics, and sends the client request accordingly.

In the illustrative embodiment described herein, the client router learns of the server states of the application servers and intermediate link metrics by way of Interior Gateway Protocol (IGP) messages propagated ("advertised") within the network (e.g., a domain), e.g., initiated at one or more server routers connected to the application servers. The IGP messages may be illustratively embodied as Intermediate-System-to-Intermediate-System (IS-IS) link state packets ("IGP advertisements"). Notably, the IGP advertisements include variable length fields, or type/length/value (TLV) encoded formats used to convey the server states and link metric information.

In accordance with one aspect of the present invention, the server routers are aware of an identification (ID) of each connected application server (server ID), as well as each server's current state (e.g., number of active connections, number of pending requests, current CPU/memory load, current utilized bandwidth, etc.). The server routers advertise the server ID and server states to routers of the domain, such as, e.g., in a novel application server (APPL_SERVER) TLV of an IGP advertisement. Each APPL_SERVER TLV may correspond to a single server ID, and each TLV may have one or more sub-TLVs used to convey the server state information of the corresponding application server.

In accordance with another aspect of the present invention, the client router receives the IGP advertisements, and illustratively computes a reverse SPT from itself to each of the application servers, i.e., using link metrics in the direction of the data stream to be sent from the application server to the requesting application client. Notably, the reverse SPTs are computed based on link metrics (e.g., link utilization, link delay, error rate, etc.) obtained from the IGP advertisements sent by the server router and any intermediate routers in the network, such as, e.g. using IGP Traffic Engineering (TE) extensions. The client router maintains a current reverse SPT based on changes/updates in the network, e.g., including changes in associated link metrics.

In accordance with still another aspect of the present invention, the client router receives ("intercepts") a client request, e.g., by determining that a request packet form/type is present, or that a server ID is the destination of the request. Alternatively, the client router may act as an application server proxy for the application client, in which case the client addresses the request to the client router, as will be understood by those skilled in the art. Upon receiving the client request, the client router determines to which application server the request is to be sent based on the server states, e.g., current load of the server, and based on the link metrics, such as from the reverse SPTs. The client router may then modify the client request to ensure that it is sent to the corresponding application server (e.g., change the destination address), or alternatively may reply to the application client with the corresponding server ID (i.e., so the application client may resend send the request to the corresponding application server).

Advantageously, the novel technique optimizes routing of application data streams on an IP backbone in a computer network. By determining where to send client requests based on server states and intermediate link metrics (e.g., from the reverse SPT), the novel technique allows client requests to be sent to an optimal application server, thus load balancing the requests. In particular, the requests may be load balanced without routing and resource utilization knowledge at the application layer, i.e., the network layer has enough information to optimize the application data streams. Also, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
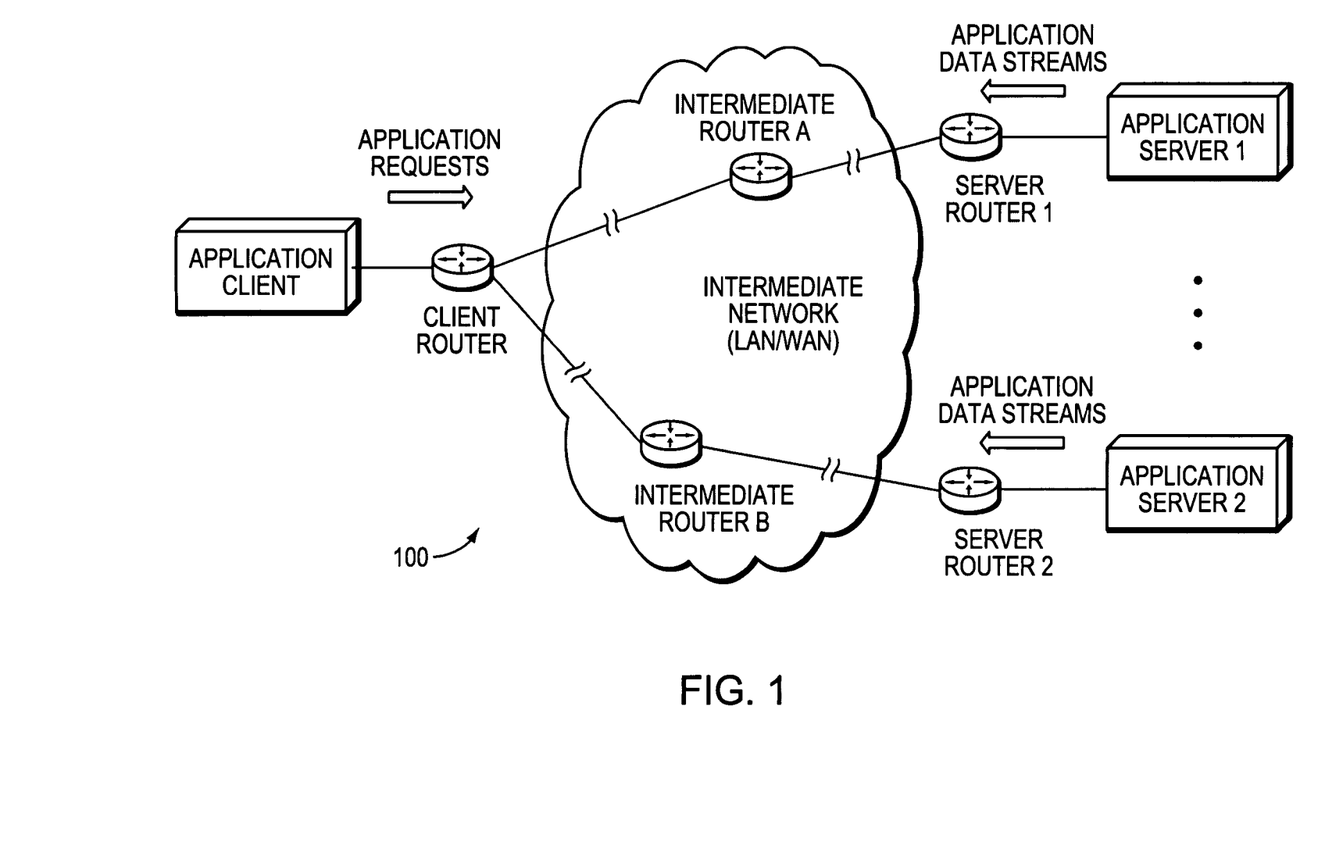
FIG. 1 is a schematic block diagram of an exemplary computer network that may be advantageously used with the present invention.

FIG. 1 is a schematic block diagram of an exemplary computer network 100 that may be advantageously used with the present invention. The network 100 comprises a plurality of interconnected network nodes, such as an application client and two or more application servers (e.g., application servers 1 and 2). Illustratively, the application client may be interconnected to a client router, and the application servers may be interconnected to a corresponding server router (e.g., server routers 1 and 2, respectively). The client router and server routers may be interconnected by an intermediate network of one or more intermediate nodes (e.g., intermediate routers A and B), such as, e.g., over wide area network (WAN) links (or local area network, "LAN" links, point-to-point links, wireless LANs, etc.), to form the network 100. The interconnected network nodes may exchange data packets according to predefined sets of network communication protocols, such as, e.g., the Transmission Control Protocol/Internet Protocol (TCP/IP). Those skilled in the art will understand that any number of nodes, links, etc., may be used in the computer network 100 and connected in a variety of ways, and that the view shown herein is for simplicity. For instance, the client router and server routers may be interconnected to more than one application client or server, respectively.

Figure 2:
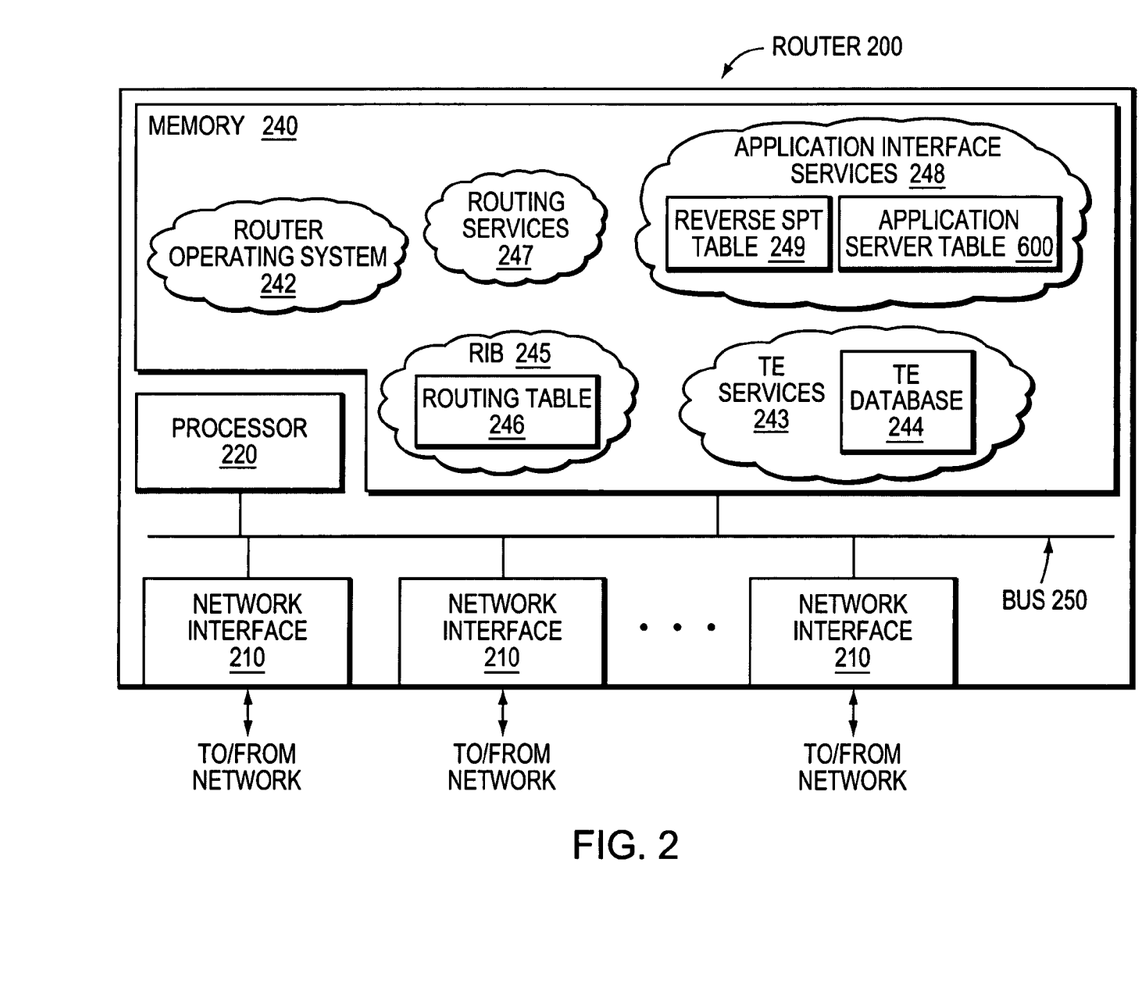
FIG. 2 is a schematic block diagram of an exemplary router that may be advantageously used with the present invention.

FIG. 2 is a schematic block diagram of an exemplary node 200, which is illustratively a router that may be advantageously used with the present invention, e.g., as a client or server router. The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 246, Traffic Engineering (TE) database 244, reverse shortest path tree (SPT) table 249, and application server table 600. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise routing services 247, routing information base (RIB) 245, TE services 243, and application interface services 248. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

Changes in the network topology may be communicated among routers 200 using a link-state protocol, such as the conventional IS-IS and OSPF protocols. Suppose, for example, that a communication link fails within an AS or a cost value associated with a network node changes. Once the change in the network's state is detected by one of the routers, that router may flood an IGP advertisement communicating the change to the other routers in the AS. In this manner, each of the routers eventually "converges" to an identical view of the network topology.

Figure 3:
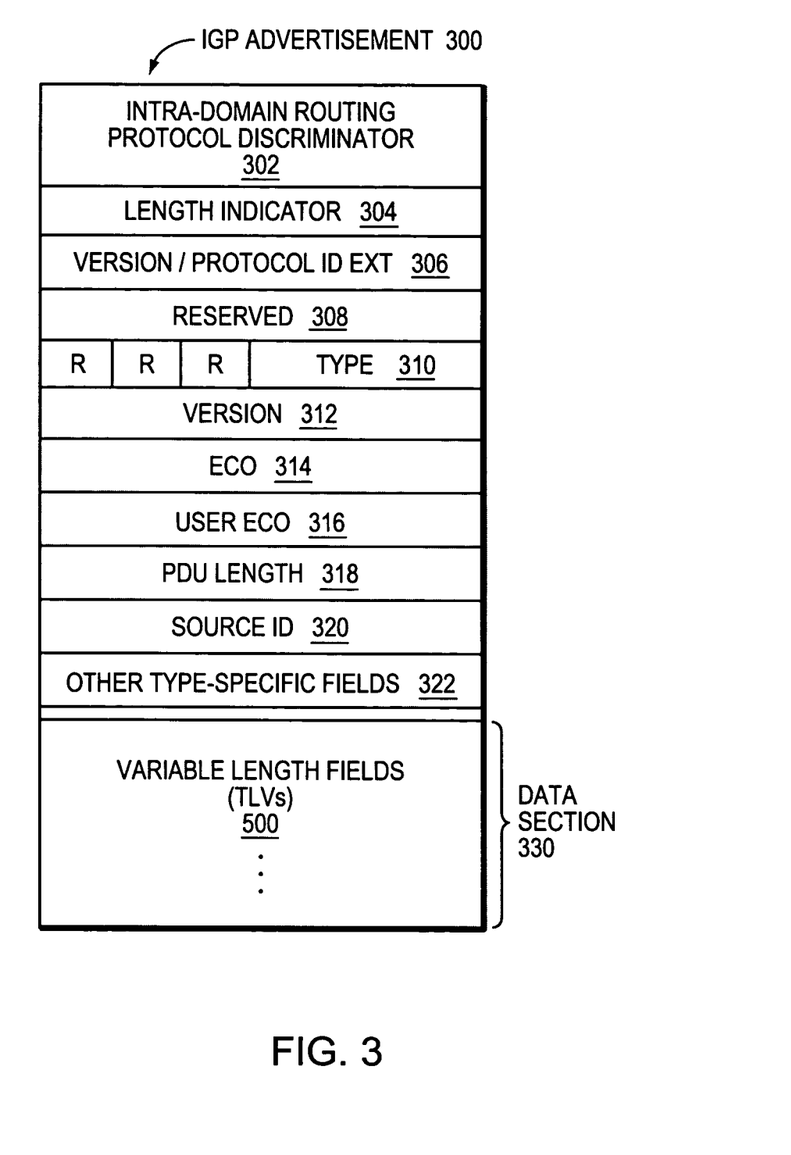
FIG. 3 is a schematic block diagram of an exemplary IGP Advertisement that may be flooded by the routers.

FIG. 3 illustrates an exemplary IGP advertisement 300 that may be flooded by the routers 200, (e.g., an IS-IS Link State Packet). The packet includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are ignored by the receiving router until directed for decoding in future versions of the protocol.

A type field 310 (and corresponding version field 312) stores a value indicating the type (and version) of IGP advertisement 300 being transmitted, which may define the existence of other type-specific fields 322 within the advertisement. For example, the type of advertisement may be a "Hello" packet, or an "LSP" packet, as will be understood by those skilled in the art. The PDU length field 318 stores a value indicating the length of the entire PDU (Protocol Data Unit, or IGP Advertisement 300), including the header, type-specific fields, and data fields. A source ID field 320 stores a value that identifies the router that generated and originally broadcast the IGP advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the IGP advertisement. Typically, the sequence number stored in the field is incremented, e.g., by one, for every new version of the IGP advertisement. The IGP advertisement 300 is therefore considered "stale" (invalid) if its sequence number is less than the sequence number stored in a previously-received version of the IGP advertisement, i.e., generated by the same advertising node. Accordingly, the routers 200 may be configured to store and forward only the most recent version of an IGP advertisement, e.g., the version having the largest sequence number. A remaining lifetime field (not shown) may also be used to store a value that may be used for determining whether the IGP Advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the IGP advertisement has become invalid. That is, every router 200 that stores or floods the IGP advertisement 300 continuously ages the packet until the remaining lifetime value equals zero. Those skilled in the art will appreciate that other aging mechanisms alternatively may be used, such as incrementing the IGP advertisement remaining lifetime value from an initial value, e.g., equal to zero, until the remaining lifetime value reaches a known upper limit. The data section 330 includes one or more variable length fields 500, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node stored in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 500 of the IGP advertisement 300, such as checksum values, padding fields, proprietary fields, etc., and application server information fields, such as a novel APPL_SERVER field (described further below). Generally, the received IGP advertisements are stored in a Link-State Database (LSDB) of the router 200 (not shown).

Referring again to FIG. 2, TE services 243 contains computer executable instructions for operating TE functions in accordance with the present invention. Examples of Traffic Engineering are described in RFC 3784, and RFC 3630 as incorporated above. A TE Database (TED) 244 may be used to store TE information provided by the routing protocols, such as IGP (e.g., in TE extended variable length fields 500) in accordance with the present invention, and is illustratively maintained and managed by TE services 243.

Application interface services 249 contain computer executable instructions executed by processor 220 to perform functions relating to one or more applications in accordance with the present invention, such as, e.g., Video on Demand (VoD), music services, etc., as will be understood by those skilled in the art. Notably, these functions may be configured to cooperate with routing services 247 and/or TE services 243, such as in accordance with the present invention described herein.

Figure 4:
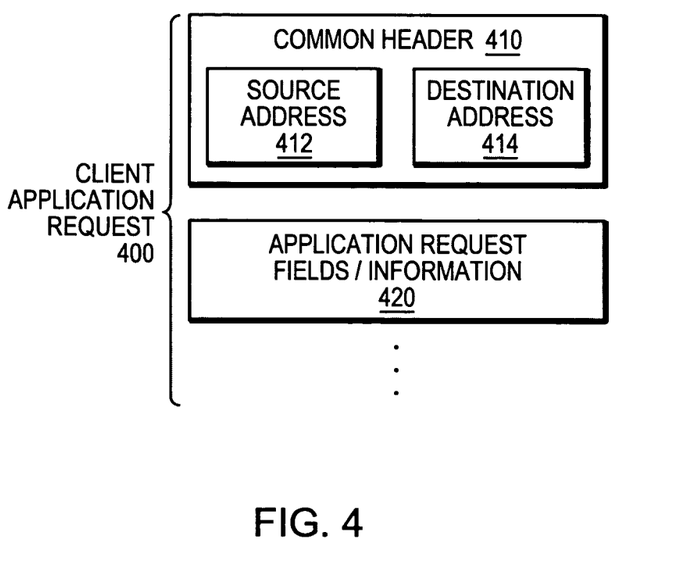
FIG. 4 is a schematic block diagram of portions of a client application request that may be advantageously used with the present invention.

In operation, an application client generally requests application content (e.g., video/music/etc.) from an application server through a "client request." FIG. 4 is a schematic block diagram of portions of a client request 400 that may be advantageously used with the present invention. Request 400 contains, inter alia, a common header 410, and application request fields and/or information object 420. Common header 410 may further comprise a source address 412 (e.g., of the application client sending the request) and a destination address 414 to which the request is sent (e.g., an application server). Typically, application services on the application client may be configured with the location of an appropriate application server, such as, e.g., through manual configuration or dynamic learning, as will be understood by those skilled in the art. Accordingly, the address of this configured application server may be included within the destination address 414 of the client request 400. The application request fields and/or information object 420 may comprise conventional application specific request information, such as request types, codes, specific fields, data, information, etc., as will also be understood by those skilled in the art.

The present invention is directed to a technique for optimizing routing of application data streams on an IP backbone in a computer network. According to the novel technique, a client router learns of server states (e.g., number of pending requests, etc.) of a plurality of application servers and also determines metrics of intermediate links between the application servers and the client router (intermediate link metrics), e.g., particularly link metrics in a direction from the application servers to the client router. Upon receiving a client request, the client router determines to which of the application servers the client request is to be sent based on the server states and intermediate link metrics, and sends the client request accordingly.

In the illustrative embodiment described herein, the client router learns of the server states of the application servers and intermediate link metrics by way of IGP messages propagated ("advertised") within the network (e.g., a domains), e.g., initiated at one or more server routers connected to the application servers, described below. The IGP messages may be illustratively embodied as IS-IS link state packets (IGP advertisements 300). Notably, the IGP advertisements include variable length fields, or TLV encoded formats used to convey the server states and link metric information.

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 5:
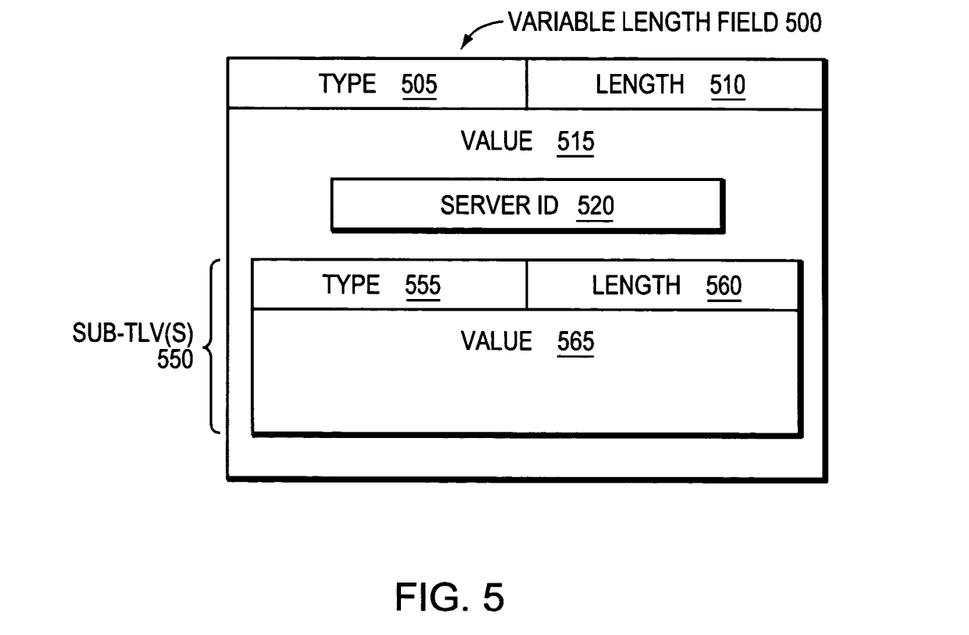
FIG. 5 is a schematic block diagram illustrating the format of Variable Length Field that may be advantageously used with the present invention.

FIG. 5 is a schematic block diagram illustrating the format of a variable length field 500 that may be advantageously used with the present invention. The variable length field 500 is illustratively embodied as a TLV contained in an IGP advertisement 300 and is extended to carry information regarding application servers. To that end, the "Application Server TLV" 500 ("APPL_SERVER") is organized to include a Type field 505 containing a predetermined type value of the novel APPL_SERVER TLV. The Length field 510 is a variable length value. The TLV encoded format may also comprise one or more non-ordered sub-TLVs 550 carried within the TLV "payload" (e.g. Value field 515), each having a Type field 555, Length field 560, and Value field 565. The fields of the TLV 500 and sub-TLV(s) 550 are used in a variety of manners, including as described herein, according to the present invention. Notably, the variable length field 500 may also be extended to carry information regarding link metrics of the network links (e.g., link utilization, link delay, error rate, etc.) using conventional TE extensions, as will be understood by those skilled in the art.

In accordance with one aspect of the present invention, the server routers are aware of an identification (ID) (e.g., an IP address) of each connected application server (server ID), as well as each server's current state. Example states of a server may comprise, e.g., a number of active application connections, a number of pending application requests, current CPU/memory load, current utilized bandwidth, etc. Notably, server information or attributes may also include an indication of available application data streams, e.g., VoD/music content available at the server, as will be understood by those skilled in the art. The server routers may be aware of the application server information based on local communication with the application server, e.g., specific message exchanges between the router and the server as will be understood by those skilled in the art, or, alternatively, the server router may maintain server states based on monitoring incoming requests and outgoing data streams. Illustratively, local communication may be embodied in a similar manner as variable length fields 500 within a specific local communication protocol.

The server routers advertise the server ID and server states to routers of the domain, such as, e.g., in a novel APPL_SERVER TLV 500 of an IGP advertisement 300. The APPL_SERVER TLV 500 is flooded to each router of the network 100 (i.e., within a domain), such as, e.g., in accordance with IS-IS network-wide flooding, (or e.g., OSPF type 10 (area-wide) or type 11 (AS-wide) opaque LSAs, as will be understood). Illustratively, each APPL_SERVER TLV 500 may correspond to a single server ID. The server ID (e.g., for application server 1) may be contained within a specific Server ID field 520 within the value field 515 of the TLV 500, or may instead be contained within a separate sub-TLV 550.

Also, each TLV 500 may have one or more sub-TLVs 550 used to convey the server state information of the corresponding application server. For example, a number of active connections of a particular server may be contained within a first sub-TLV corresponding to the TLV 500 for the server, and a second sub-TLV 550 may contain a number of pending requests, etc. In this way, the server routers inject knowledge of application server information (ID and states) into IGP advertisements forwarded to routers (e.g., client routers) of the network.

Figure 6:
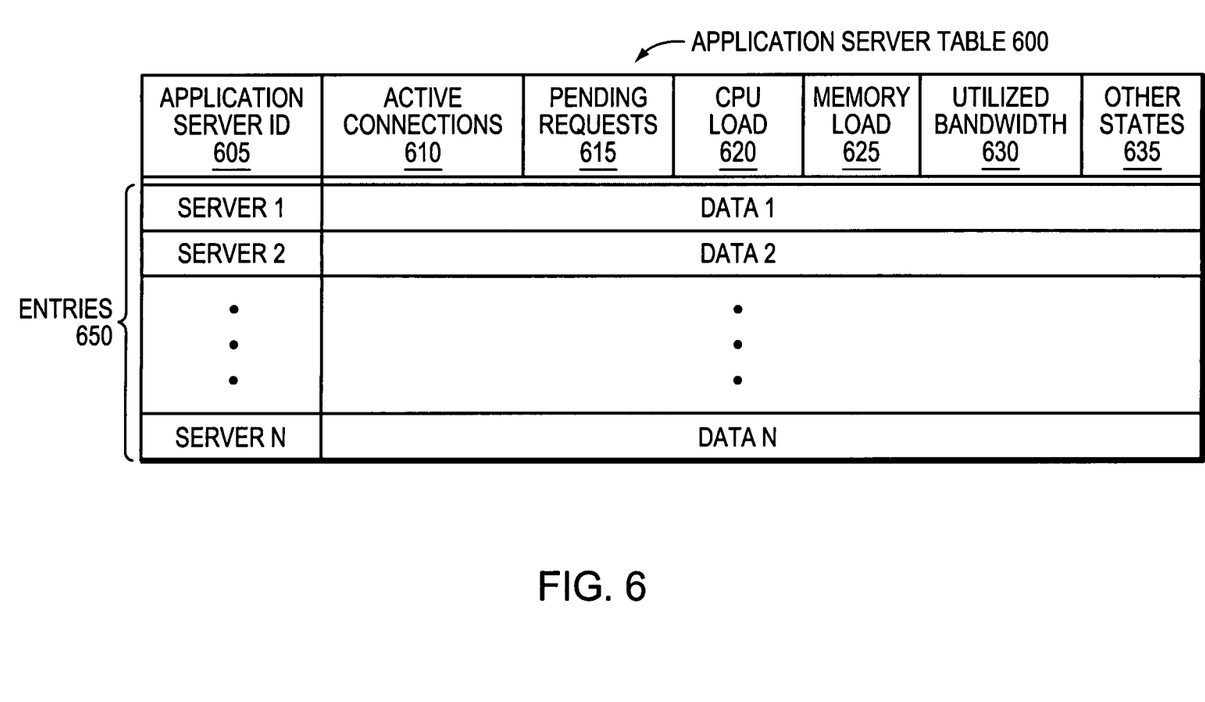
FIG. 6 is schematic block diagram of an exemplary application server table that may be advantageously used with the present invention.

Each router of the network (e.g., intermediate routers and client/server routers) receives the IGP advertisements 300 having the APPL_SERVER TLV 500, and correspondingly maintains a table of application server information. FIG. 6 is schematic block diagram of an exemplary application server table 600 that may be advantageously used with the present invention. Application server table 600 is illustratively a data structure stored in memory 240 of the routers and includes one or more entries 650, each comprising a plurality of fields for storing an application server ID 605, and one or more server state information fields, such as active connections 610, pending requests 615, CPU load 620, memory load 625, utilized bandwidth 630, and other states 635. The application server table 600 is illustratively maintained and managed by application interface services 248. Upon receiving an APPL_SERVER TLV 500, a router stores the corresponding application server ID (e.g., Server 1-N) in field 605, and further stores any additional data (e.g., Data 1-N) in respective server information fields 610-635. Notably, the routers maintain current values for the data by updating the table each time a new/updated APPL_SERVER TLV 500 is received in an IGP advertisement 300. Moreover, a separate table may be maintained for each specific application (e.g., for VoD, music, etc.).

In accordance with another aspect of the present invention, the client router receives the IGP advertisements, and illustratively computes a reverse SPT from itself to each of the application servers, i.e., using link metrics in the direction of the data stream to be sent from the application server to the requesting application client. Notably, the reverse SPTs are computed based on link metrics (e.g., link utilization, link delay, error rate, etc.) obtained from the IGP advertisements sent by the server router and any intermediate routers in the network, such as, e.g. using IGP TE extensions or other methods to convey link metrics. Moreover, in addition to the link metrics mentioned herein, those skilled in the art will understand that any static or dynamic metric/attribute associated with the links (e.g., that may reflect the real time state of the link) may be used in accordance with the present invention.

Figure 7:
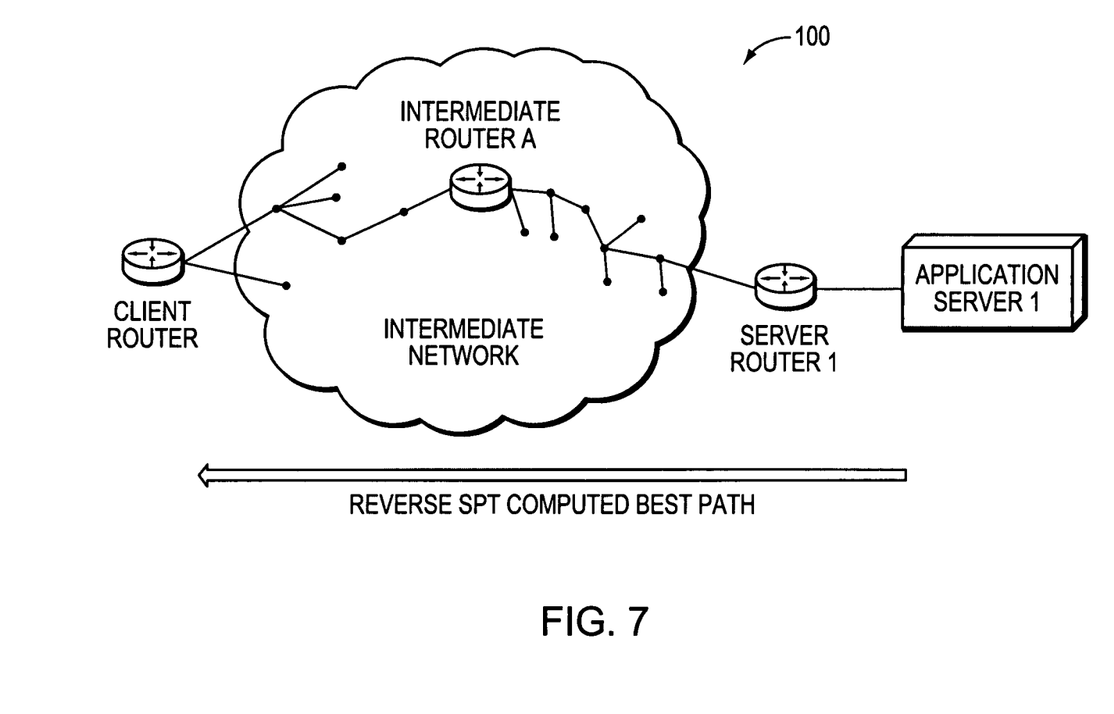
FIG. 7 is a schematic block diagram of the computer network in FIG. 1 showing a reverse shortest path tree (SPT) computed in accordance with the present invention.

The reverse SPT provides the client router with a set of shortest paths from each application server toward the client router itself that take into account the link metrics toward the client router. It is important to note that the reverse SPTs are optimally used in accordance with the present invention because a load balancing algorithm implemented by the client router should consider the link metrics on the path from the server to the client, and not from the client to the server. FIG. 7 is a schematic block diagram of the computer network in FIG. 1 showing a reverse SPT computed in accordance with the present invention. Illustratively, the client router computes the reverse SPT with itself as the root, and determines the shortest path from the application server, e.g., application server 1 (or server router, e.g., server router 1) that may be used by the requested application data stream. A reverse SPT (or "rSPT") is generally known in the art, and may be computed in a manner similar to that of a conventional SPT. In a reverse SPT, however, the computing node (e.g., the client router) uses the link metrics in the direction from other routers in the network toward itself. In other words, a reverse SPT defines the set of shortest paths from any other router in the network (e.g., the application servers) down to the computing router (e.g., the client router). Notably, various branches to other intermediate routers (not shown) not selected as the shortest (best) to reach the client node are shown for illustration. The client router maintains the reverse SPT current based on changes/updates in the network, e.g., including changes in associated link metrics. The reverse SPTs are maintained current so that the client router is capable of selecting the best (e.g., optimal) application server to which to send client requests according to predefined criteria, such as, e.g., a configured link utilization of the requested data stream, etc., described below.

In accordance with still another aspect of the present invention, the client router receives ("intercepts") a client request, e.g., by determining that a request packet form/type is present, or that a server ID is the destination of the request. For instance, the client router may examine the content of packets received from the application client, and process the content at the router/network layer. In particular, the client router searches for a packet format, type, or specific content that corresponds to a client request 400, as will be understood by those skilled in the art. Also, by referencing the destination address of the packets against the list of application server IDs (e.g., in field 605 of application server table 600), the client router may determine that the packet is a client request 400. Application layer packet intercepting is generally known and understood by those skilled in the art, and any such intercepting techniques to determine that the packet is a client request 400 may be used in accordance with the present invention. Alternatively, the client router may act as an application server proxy for the application client. In other words, the client router may advertise itself to the application client as an application server to which requests generally destined for actual application servers (e.g., application server 1 and 2) may be sent. In this case, the application client addresses the request to the client router, i.e., assuming that the client router is the application server, as will be understood by those skilled in the art.

Upon receiving the client request, the client router determines to which application server the request is to be sent based on the server states, e.g., current load of the server (number of connections/requests, CPU/memory load, etc.), and based on the link metrics (e.g., link utilization), such as from the reverse SPTs. The server states for the available servers may be determined by inspecting the application server table 600. By applying a load balancing algorithm to the application servers based on server states, and also including intermediate link metrics in the algorithm, e.g., from the reverse SPTs, the present invention allows for more optimal routing of the client requests and hence the resultant application data streams.

Various load balancing techniques that will be understood by those skilled in the art may be adapted for use with the present invention to take into consideration server states and link metrics. For instance, based on pre-defined criteria of the requests, e.g., a projected increase in link utilization based on the requested data stream, the client router may determine that the reverse SPT from certain application servers (e.g., application server 2) is more congested, and may not be able to accommodate the additional traffic, as compared to other application servers (e.g., application server 1). However, the client router must also consider whether the other application servers (e.g., server 1) are overloaded in other server states, such as, e.g., CPU and/or memory load. Other comparisons and load balancing technique will be understood by those skilled in the art, and those mentioned here are merely representative examples.

Once the client router determines (selects) the best application server, the client router then attempts to ensure that the client request is forwarded to the selected application server. For example, the client router may determine whether the client request 400 is already destined (e.g., in destination address 414) to the selected application server (e.g., application server 1), in which case the request 400 is forwarded by the client router. If, on the other hand, the client request 400 is destined to a different application server (e.g., application server 2), then the client router attempts to correct the destination of the request.

To correct the destination of the client request 400, the client router may modify the client request to ensure that it is sent to the corresponding application server (e.g., change the destination address 414). For instance, the client router may encapsulate the client request into a new IP header 410 to the selected application server, and send the request on behalf of the client (e.g., with the source address 412 remaining as the application client address), i.e., "identity substitution." Alternatively, the client router may reply to the application client with the corresponding server ID, e.g., through a local communication protocol, e.g., IGP (routing layer), or, illustratively, via an application specific protocol (application layer) as will be understood by those skilled in the art. If so configured, in this instance, the application client may re-send the request 400 to the corresponding application server, i.e., with the selected application server address in destination address field 414.

Figure 8:
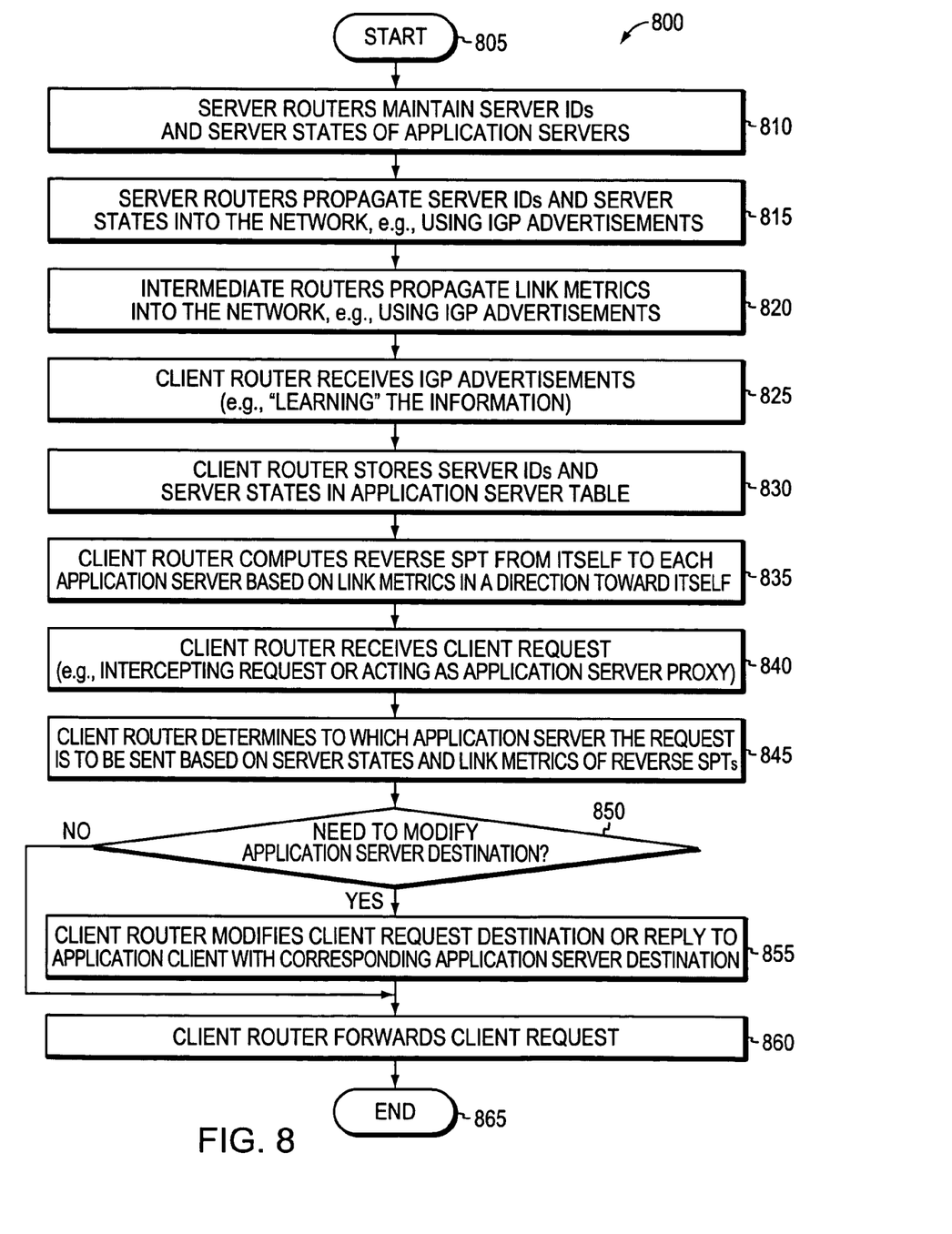
FIG. 8 is a flowchart illustrating a procedure for optimizing routing of application data streams on an IP backbone in accordance with the present invention.

FIG. 8 is a flowchart illustrating a procedure for optimizing routing of application data streams on an IP backbone in accordance with the present invention. The procedure 800 starts at step 805, and continues to step 810, where the server routers (e.g., server routers 1 and 2) maintain server IDs and server states of connected application servers (e.g., application servers 1 and 2, respectively), as described above. In step 815, the server routers propagate the server IDs and server states into the network, e.g., using APPL_SERVER TLVs 500 in IGP advertisements 300. Intermediate routers (e.g., intermediate routers A and B) propagate link metrics (e.g., link utilization) of the links within the network, e.g., also using IGP advertisements 300, such as through TE extensions, as described above. The client router receives the IGP advertisements 300 in step 825, thus learning the information, and in step 830 stores the server IDs and server states in application server table 600. In step 835, to illustratively determine the intermediate link metrics, the client router may then compute reverse SPTs from itself to each application server (based on the link metrics toward itself, as described above), and store the reverse SPTs, e.g., in a reverse SPT table 249. Notably, the client router may update the table 600 or the computed reverse SPTs in response to received changes/updates in the network.

In step 840, the client router receives a client request 400, such as, e.g., through intercepting the request or by acting as an application server proxy, both as described above. In response, the client router determines to which application server the request is to be sent based on server states and intermediate link metrics, e.g., of the reverse SPTs, in step 845, also as described above. If there is a need to modify the application server destination of the request (i.e., a more optimal server could be used) in step 850, the client router may either modify the client request destination (e.g., by changing destination address 414), or may instead reply to the application client with the corresponding application server destination (e.g., the address and/or server ID of the more optimal server). The client router, in step 860, may then forward the client request to the corresponding application server. Notably, in response to informing the application client of the corresponding application server destination, the client router may forward a returned request from the application client with the corresponding application server destination (e.g., a "re-received" request). The procedure 800 ends in step 865.

Advantageously, the novel technique optimizes routing of application data streams on an IP backbone in a computer network. By determining where to send client requests based on server states and intermediate link metrics (e.g., from the reverse SPT), the novel technique allows client requests to be sent to an optimal application server, thus load balancing the requests. In particular, the requests may be load balanced without routing and resource utilization knowledge at the application layer, i.e., the network layer has enough information to optimize the application data streams. Also, the dynamic nature of the novel technique alleviates the need for cumbersome manual configuration.

While there has been shown and described an illustrative embodiment that optimizes routing of application data streams on an IP backbone in a computer network, it is to be understood that various other adaptations and modifications may be made within the spirit and scope of the present invention. For example, the invention has been shown and described herein using IS-IS link state packets as the IGP advertisements 300. However, the invention in its broader sense is not so limited, and may, in fact, be used with other IGP advertisements, such as OSPF LSAs (e.g., type 10 or 11 opaque LSAs) as will be understood by those skilled in the art. Moreover, while the above description describes performing the technique at a client router connected to the application client, the technique may be performed at other nodes within the network, such as the application client itself, given proper configuration as will also be understood by those skilled in the art. Further, while the invention has be shown and described using reverse SPTs to manage the intermediate link metric information, those skilled in the art will understand that other techniques may be used to collect/utilize intermediate link metrics in accordance with the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. An apparatus comprising:
   means for learning server states for each of a plurality of application servers that serve application content, each server state descriptive of load upon a respective one of the plurality of application servers; wherein the server states are selected from a group consisting of: a number of pending requests at an application server, a number of active connections at an application server, a current processor load of an application server, a current memory load of an application server, and a current utilized bandwidth of an application server;

means for computing a reverse shortest path tree (SPT) from each application server to a client router as a root;

means for receiving an application request from an application client at the client router, the application request requesting application content be provided to the application client;

means for determining to which of the plurality of application servers the application request from the application client is to be sent based on a combination of the server states and reverse SPTs; and means for sending the application request to the determined application server.

2. A non-transitory computer readable storage medium containing executable program instructions, the executable program instructions comprising program instructions for:

learning server states for each of a plurality of application servers that serve application content, each server state descriptive of load upon a respective one of the plurality of application servers; wherein the server states are selected from a group consisting of: a number of pending requests at an application server, a number of active connections at an application server, a current processor load of an application server, a current memory load of an application server, and a current utilized bandwidth of an application server;

computing a reverse shortest path tree (SPT) from each application server to a client router;

receiving an application request from an application client at the client router, the application request requesting application content be provided to the application client;

determining to which of the plurality of application servers the application request from the application client is to be sent based on a combination of the server states and reverse SPTs; and sending the application request to the determined application server.

3. A node comprising:

one or more network interfaces;

a processor coupled to the one or more network interfaces and adapted to execute software processes; and a memory adapted to store an application interface process executable by the processor, the application interface process configured to: i) learn server states for each of a plurality of application servers that serve application content, each server state descriptive of load upon a respective one of the plurality of application servers that provide content in response to requests, ii) compute a reverse shortest path tree (SPT) from each application server to the node, iii) receive an application request from an application client, the application request requesting application content be provided to the application client, iv) determine to which of the plurality of application servers the application request from an application client is to be sent based on a combination of the server states and reverse SPTs, and v) send the application request to the determined application server;

wherein the server states are selected from a group consisting of: a number of pending requests at an application server, a number of active connections at an application server, a current processor load of an application server, a current memory load of an application server, and a current utilized bandwidth of an application server.

4. The node of claim 3, wherein the application interface process is further configured to:

receive a packet;

determine that the received packet is an application request from the application client; and intercept the application request from the application client.

5. The node of claim 4, wherein the application interface process is further configured to:

determine that the received packet is the application request from the application client based on at least one of a request packet type and a destination of the packet identifying an application server.

6. The node of claim 3, wherein the node is a client router.

7. The node of claim 3, wherein the node is an application server proxy.

8. The node of claim 3, wherein the application interface process is further configured to:

learn at least one of the server states of the application servers through one or more advertisements.

9. The node of claim 8, wherein the advertisements are Interior Gateway Protocol (IGP) messages.

10. The node of claim 8, wherein the application interface process is further configured to:

receive the advertisements from one or more server routers, the server routers in communication with the application servers.

11. The node of claim 3, wherein the application interface process is further configured to:

determine metrics of intermediate links between the application servers and the node, wherein the reverse SPTs are computed based on the metrics of intermediate links between the application servers and the node.

12. The node of claim 11, wherein the metrics of intermediate links between the application servers and the node are selected from a group consisting of: a link utilization, a link delay, and an error rate.

13. The node of claim 11, wherein the metrics of intermediate links between the application servers and the node correspond to metrics in a direction of a data stream to be sent from at least one of the plurality of application servers to the application client.

14. The node of claim 3, wherein the application interface process is further configured to:

modify a destination of the application request from the application client to send the application request from the application client to the determined application server.

15. The node of claim 3, wherein the application interface process is further configured to:

inform the application client of the determined application server.

16. The node of claim 15, wherein the application interface process is further configured to:

receive a re-sent application request from the application client to the determined application server.

17. The node of claim 3, wherein the determined application server is an optimal application server based on the server states and the reverse SPTs.

18. The node of claim 3, wherein the application interface process is further configured to:

receive a plurality of application requests from application clients; and load balance the plurality of application requests from application clients to the plurality of application servers based on the server states and the reverse SPTs.

19. A method comprising:
learning server states for each of a plurality of application servers that serve application content, each server state descriptive of load upon a respective one of the application servers from serving application content; wherein the server states are selected from a group consisting of: a number of pending requests at an application server, a number of active connections at an application server, a current processor load of an application server, a current memory load of an application server, and a current utilized bandwidth of an application server;
determining, by a first processor of a client router, intermediate link metrics between the application servers and the client router; wherein the intermediate link metrics correspond to metrics in a direction of a data stream to be sent from at least one of the plurality of application servers to the application client;
receiving at an interface of the client router an application request from an application client, the application request requesting application content be provided to the application client;
determining, by the first or a second processor of the client router to which of the plurality of application servers the application request from the application client is to be sent based on a combination of the learned server states and the determined router intermediate link metrics between the application servers and the client router; and
sending the application request to the determined application server.

20. The method as in claim 19, further comprising:
performing at the client router each of the steps of learning, determining the metrics, receiving, and determining to which of the plurality of application servers.

21. The method of claim 19, wherein receiving an application request from an application client further comprises:
receiving a packet;
determining that the received packet is an application request from the application client; and
intercepting the application request from the application client.

22. The method of claim 21, further comprising:
determining that the received packet is the application request from the application client based on at least one of a request packet type and a destination of the packet identifying an application server.

23. The method of claim 19, further comprising:
sending the application request from the application client to the client router, wherein the client router is an application server proxy.

24. The method of claim 19, wherein the client router learns at least one of the server states of the application servers through one or more advertisements.

25. The method of claim 24, wherein the advertisements are Interior Gateway Protocol (IGP) messages.

26. The method of claim 24, further comprising:
propagating the advertisements from one or more server routers, the server routers in communication with the application servers.

27. The method of claim 19, wherein the intermediate link metrics are selected from a group consisting of: a link utilization, a link delay, and an error rate.

28. The method of claim 19, wherein the sending comprises:
modifying a destination of the application request and forwarding the modified application request to the determined application server.

29. The method of claim 19, further comprising:
informing the application client of the determined application server.

30. The method of claim 29, wherein the sending comprises:
re-sending the application request from the application client to the determined application server.

31. The method of claim 29, further comprising:
computing a reverse shortest path tree (SPT) from the client router to each of the plurality of application servers based on the intermediate link metrics.

32. The method of claim 31, wherein the determined application server is determined based on the reverse SPTs.

33. The method of claim 19, wherein the determined application server is an optimal application server based on the server states and intermediate link metrics.

34. The method of claim 19, further comprising:
receiving a plurality of application requests from application clients at the client router; and
load balancing the plurality of application requests from application clients to the plurality of application servers based on the server states and intermediate link metrics.

* * * * *